United States Patent [19]

Boris

[11] Patent Number: 5,503,905
[45] Date of Patent: Apr. 2, 1996

[54] TICK PATTERN FOR SIMULATED WOOD TRANSFER FILMS AND METHOD OF MAKING SAME

[75] Inventor: Gregory J. Boris, Boothwyn, Pa.

[73] Assignee: Leonhard Kurz GmbH & Co., Furth, Germany

[21] Appl. No.: 206,304

[22] Filed: Mar. 3, 1994

[51] Int. Cl.⁶ .................................................. B32B 3/00
[52] U.S. Cl. ......................... 428/195; 428/204; 428/212; 428/411.1; 428/488.4; 428/913; 428/914
[58] Field of Search ................................. 525/199, 200; 428/195, 422, 171, 203, 211, 502, 13, 29, 577, 41, 67, 76, 15, 187, 212, 411.1, 484, 488.4, 500, 502, 524, 343, 352, 354, 204, 913, 914; 156/235, 240, 234

[56] References Cited

U.S. PATENT DOCUMENTS

| | | | |
|---|---|---|---|
| 3,389,013 | 6/1968 | Armitage et al. | 117/45 |
| 3,452,861 | 7/1969 | Erwin | 206/59 |
| 3,666,516 | 5/1972 | Dunning | 117/3.4 |
| 3,770,479 | 11/1973 | Dunning | 117/3.4 |
| 3,811,915 | 5/1974 | Burrell et al. | 117/45 |
| 3,936,570 | 2/1976 | Iwata | 428/349 |
| 3,953,635 | 4/1976 | Dunning | 428/151 |
| 4,007,067 | 2/1977 | Dunning | 156/61 |
| 4,400,487 | 8/1983 | Stoneberg et al. | 525/199 |
| 4,765,858 | 8/1988 | Vankerckhoven et al. | 156/235 |
| 4,856,857 | 8/1989 | Takeuchi et al. | 350/3.6 |
| 5,203,941 | 4/1993 | Spain et al. | 156/209 |
| 5,322,899 | 6/1994 | Grunewalder et al. | 525/199 |

*Primary Examiner*—Patrick J. Ryan
*Assistant Examiner*—William A. Krynski
*Attorney, Agent, or Firm*—Panitch Schwarze Jacobs & Nadel

[57] ABSTRACT

A heat-transferable film and a method for providing a tick pattern on a film-decorated substrate is provided. The heat-transferable film comprises (1) a transfer layer in facing engagement with a substrate having a first gloss level, at least one color, and a heat-activatable adhesive layer; (2) a plurality of individual spaced-apart markings, the markings having a color different from the color or colors within the transfer layer and a second gloss level different from the first gloss level, the markings adhered to the top of the transfer layer; and (3) a carrier sheet adhered to the top of the individual spaced-apart markings. Heat and pressure are applied to the top of the carrier sheet such that the heat-activatable adhesive affixes the heat-transferable film to the substrate. The individual spaced-apart markings are split along a plane generally parallel to that of the film by stripping the carrier sheet from the film, whereby a first portion of the each marking remains adhered to the carrier sheet after removal and a second portion of each marking remains adhered to the transfer layer, the second portion of each marking thereby forming a tick pattern.

20 Claims, 1 Drawing Sheet

TICK PATTERN FOR SIMULATED WOOD TRANSFER FILMS AND METHOD OF MAKING SAME

FIELD OF THE INVENTION

The present invention relates to simulated wood transfer films and a method of making the same. More particularly, the invention is directed to the provision of a realistic tick pattern in simulated wood transfer films.

BACKGROUND OF THE INVENTION

Simulated wood transfer films are used for providing the appearance of real wood grain to many surfaces including furniture, countertops, walls, siding and automobiles. In order to enhance the wood-like appearance of such films, those skilled in the art have employed various methods to simulate the texture and grain pattern of real wood. The roughened texture of natural wood is a result in part of small indentations or slash marks present throughout the grain pattern known as tick marks.

Early methods for simulating a natural wood design involved embossing to form a series of depressions in the wood grain pattern provided on film as described, for example, in U.S. Pat. No. 3,452,861 by Ervin.

U.S. Pat. Nos. 3,666,516, 3,770,479 and 3,953,635 by Dunning utilized indentations in combination with a change in specular reflectance, i.e., gloss level, on heat-stamped simulated wood film to improve upon merely embossed depressions. While improving upon methods of providing ticks by mere indentation, adding a change in gloss level still does not provide a sufficiently realistic simulation of a real wood tick pattern, because the optical effect is not sufficiently perceived when viewed from an angle perpendicular to the plane of the film. The maximum optical effect from such a tick is perceived when viewed at an angle of approximately 45° to the plane of the film.

The reason a natural tick can be perceived at varied angles is that in addition to the actual depression or indentation in the wood surface, a color is present in the indentation. Thus, the appearance of the optical effect of an indentation would be enhanced if the areas of lower gloss level also possessed coloration.

A simulated wood film is manufactured by providing individual coatings or layers to a polymer film. Wood patterns are created by providing various consecutive ink prints in alignment with one another upon the film by gravure roller. The pattern is kept in alignment, or registration, by varying methods of process control. Manufacturers have attempted to register a coating providing the optical tick marks and a second further coating which provides coloration to those marks. These attempts have not been successful due to the small size of the marks and the degree of registration currently attainable by available methods of process control.

One such early attempt is found in U.S. Pat. No. 3,936,570. In the transfer material described in that patent, gaps are made in a fully releasable stripping layer adhered to a carrier sheet. A design coat which may cover the entire stripping layer or only the gaps is then coated on the stripping layer. When the carrier sheet is removed, the stripping layer fully remains on the transferred wood film and a portion of the design layer is torn away with the carrier creating an uneven physical embossing on the surface of the transferred film. While the design layer may optionally contain pigment and provides a change in specular reflectance, it is unevenly depressed beneath the surface of the film and the stripping layer incompletely covers the surface of the film.

There is a need in the art for a simulated wood transfer film having a tick pattern which more closely resembles that of the indentations in real wood due to the presence of color and a lower gloss within the tick marks, but which does not require embossing or gaps in the protective covering.

SUMMARY OF THE INVENTION

It has been discovered according to the present invention that by providing both a different color and a lower gloss level within a single coating, an improved optical effect is created without indentation in the surface of the film and without the need for alignment of two separate coatings.

The simulated heat-transferable film according to the present invention, particularly for simulated wood grains, comprises a transfer layer, a plurality of individual spaced-apart markings and a carrier sheet. The transfer layer, which is affixable on the bottom to a substrate, has a first gloss level and at least one color. The plurality of individual spaced-apart markings have a second gloss level, different from the first gloss level, and a color different from the color or colors within the transfer layer. The individual spaced-apart markings are adhered to the top of the transfer layer.

The carrier sheet is adhered to the top of the individual spaced-apart markings such that upon application of heat and pressure to the film, and subsequent removal of the carrier sheet, the markings are split along a plane generally parallel to that of the film. The first portion of each marking remains adhered to the carrier sheet. The second portion of each marking remains adhered to the transfer layer such that the second portion of each marking forms a tick pattern on the top of the transfer layer.

The pigmented, lower gloss tick provides a realistic looking tick pattern. The change in gloss between the surface of the transfer layer and the tick provides an optical effect contributing to the simulation of a real wood tick. The color within the tick layer, combined with the change in gloss, further enhances that optical effect, providing a more realistic appearance to the tick markings.

In one embodiment of the invention, the transfer layer comprises several individual layers. A heat-activatable adhesive layer on the bottom of the transfer layer is provided for affixing to a substrate. A base coat is adhered to the top of the heat-activatable adhesive layer. At least one print layer comprising an ink pattern is adhered to the top of the base coat. A protective layer covers and adheres to the top of the print layer or print layers. This layer also acts as a release layer. The plurality of individual spaced-apart markings are adhered to the top of the protective release layer.

The individual spaced-apart markings that make up the tick layer preferably comprise a mixture of soluble resins, particles of wax, pigment and fluoropolymer dispersed within the mixture of soluble resins, and a catalyst. The catalyst promotes and accelerates cross-linking reactions between the soluble resin mixture and resins within the transfer layer and between the soluble resin mixture and the carrier sheet. The result of this cross-linking is a strong adherence of the markings to both the carrier sheet and the transfer layer.

The present invention also comprises a method for providing a tick pattern on a film-decorated substrate, comprising the steps of applying a heat-transferable film, as described above, to a substrate such that the bottom of the heat-transferable film is in facing engagement with the substrate and applying heat and pressure to the top of the film carrier sheet such that the heat-activatable adhesive within the transfer layer of the film affixes the heat-transferable film to the substrate. The method further comprises the step of splitting the individual spaced-apart markings along a plane generally parallel to that of the film by stripping the carrier sheet from the film, whereby, a first portion of each marking remains adhered to the carrier sheet after removal and a second portion of each marking remains adhered to the transfer layer, the second portion of each marking thereby forming a tick pattern.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments of a heat-transferable film which are presently preferred. It should also be understood, that the invention is not limited to the precise arrangements and instrumentalities shown. In the drawings.

Figure 1:
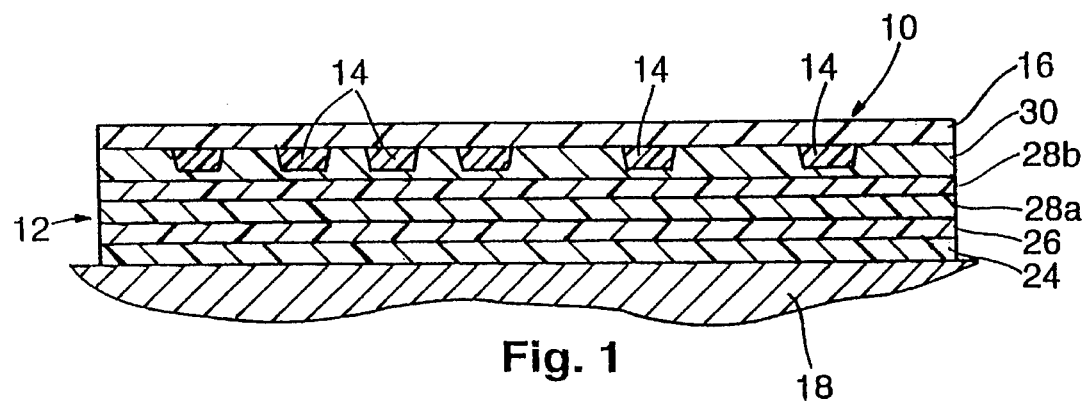
FIG. 1 is a cross-sectional representation of one embodiment of the heat-transferable film.

In the drawings, like numerals are used to indicate like elements throughout. For ease and clarity of illustration, individual layers of the film 10 are shown as extending transversely from one side of the film to the other. However, it should be understood to one skilled in the art that the individual layers of the film 10 may be partial and segmented, for example if a gravure roller is used to apply those layers comprising a wood-grain pattern to the film, the individual layers may actually comprise only a partial transverse layer within the film 10.

DETAILED DESCRIPTION OF PREFERRED EMBODIMENTS

Certain terminology is used in the following description for convenience only and is not limiting. The words "lower" and "upper" and "top" and "bottom" designate directions in the drawings to which reference is made. The terminology includes the words above specifically mentioned, derivatives thereof and words of similar import. In addition, the terms "ticks" and "markings" are used interchangeably and should be given the same meaning. The invention is described generally in terms of a film comprising a wood-grain pattern; however, other patterns and designs may be substituted for wood-grain as desired without departing from the claimed invention. The invention is also described in terms of a pattern comprising realistic-looking wood ticks; however, markings provided to other patterns which impart both an optical effect and a change in color such that the markings appear to be indented or raised from the surface are also contemplated as within the scope of the claimed invention.

Figure 2:
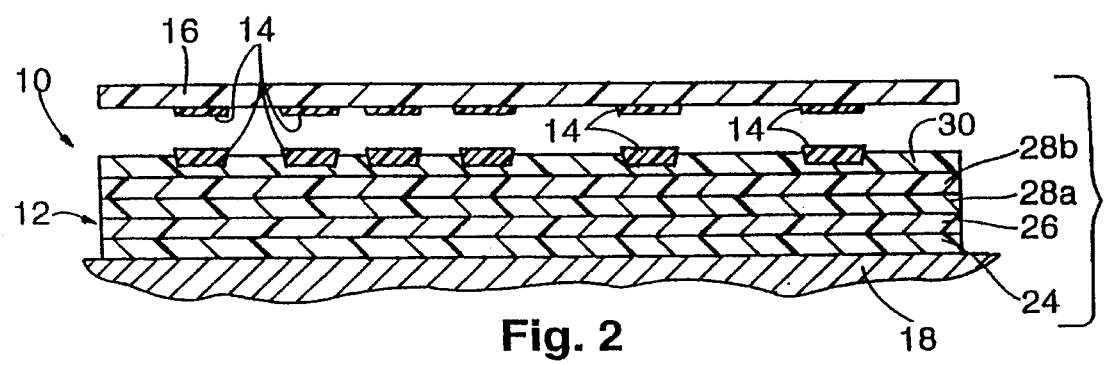
FIG. 2 is a cross-sectional representation of the embodiment shown in FIG. 1 upon removal of the carrier sheet.
Figure 3:
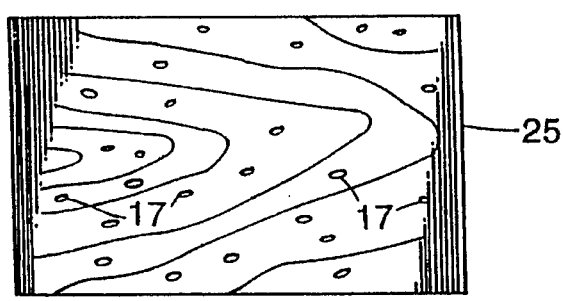
FIG. 3 is a plan view of a typical wood grain pattern.

As shown in FIG. 1 and 2, the heat-transferable film 10 according to the present invention comprises a transfer layer 12, a plurality of individual spaced-apart markings 14 and a removable carrier sheet 16. The film 10 is manufactured by applying the individual spaced-apart markings 14 or ticks 14 with a gravure-head roller to the carrier sheet 16 in order to create a tick pattern 17 as shown in FIG. 3. The carrier sheet 16 is the base of the film from a manufacturing perspective. The transfer layer 12 is then applied to the ticks 14 in several consecutive layers. When applying the film 10 to a substrate 18, the transfer layer 12 is placed in facing engagement with the substrate 18. The transfer layer 12 serves as the main body of the film 10. The transfer layer 12 is affixable to a substrate 18 by the application of heat and pressure. The latter is known to those skilled in the art as hot-stamping.

The top of the transfer layer 12 adheres to the ticks 14 and serves as a protective coating for the remainder of the transfer layer 12. The carrier sheet 16 also adheres to the ticks 14 by bonding with the resins used in the tick 14 formulations thereby facilitating the splitting of the ticks 14 upon removal of the carrier sheet 16. After the bottom of the transfer layer 12 is affixed to the substrate 18, the carrier sheet 16 is removed. A portion of each of the ticks 14 remains adhered to the carrier sheet 16 thereby splitting the ticks 14 along a plane generally parallel to that of the film 10 as shown in FIG. 2. The portion of the ticks 14 which is not adhered to the carrier sheet 16 upon removal, remains on the top of the transfer layer 12 creating a realistic tick pattern. In a typical example, about 10% to about 15% of each tick 14 is removed with the carrier sheet 16.

As shown in FIG. 1 and 2, the transfer layer 12 is made up of several individual layers. The first layer, which functions to affix the film 10 to the substrate 18 is a heat-activatable adhesive layer 24. A base coat 26 is provided on top of the adhesive layer 24 to provide a base color to the film 10. The wood-grain pattern is created by providing at least one, but preferably several print coats 28a, 28b on top of the base coat 26. A protective release coat 30 is adhered to the top of the print coats 28a, 28b, thereby shielding the lower layers of the film 10 from impact and other surface damage and protecting the integrity of the ticks 14 by preventing migration of unwanted compounds from other layers within the film 10. In addition, the protective layer 30 bonds to the ticks 14 to facilitate splitting of the ticks 14. The protective release layer 30 also allows the transfer film 10 to be easily removed from the carrier sheet 16 when heat transferred.

Beginning with the substrate 18, and describing the various layers of the film in greater detail from the substrate 18 up to the carrier sheet 16, it will be understood by those skilled in the art that the substrate 18 can be any surface capable of bonding to the film 10 of the present invention. Typical substrates 18 include, among others, wood, plastic, metal and ceramic. It is understood by those skilled in the art that other substrates 18 may be used without departing from the present invention.

The adhesive chosen for the adhesive layer 24 to be affixed to the substrate 18 should be one which, upon application of heat and pressure to the carrier sheet 16, will strongly adhere to the substrate 18 in full facing engagement, forming a smooth, uniform bond to the substrate 18 with little or no edge pull-back. A pressure-sensitive adhesive may be substituted for a heat-activatable adhesive 24 without departing from the present invention. However, such a pressure-sensitive adhesive is not preferred, as the use of heat helps to soften and fuse the layers of the film 10 to promote bonding of the carrier sheet 16 and of the protective layer 30 to the ticks 14, thereby aiding in effective splitting of the ticks 14.

It will be understood by those skilled in the art that the choice of an appropriate adhesive 24 formulation is dependent upon the substrate 18 to which the film 10 is to be affixed and suitable adhesives are well known in the art. For example, for application to a wood substrate 18, a preferred adhesive layer 24 would be a formulation comprising polyacrylate, polyamide and mixtures thereof. The adhesive 24 in such a case preferably comprises polyacrylate and polyamide in a range of ratios from about 1:99 to 99:1 polyacrylate to polyamide. If the film 10 is to be applied to a plastic substrate 18, the preferred adhesive layer 24 would be a formulation comprising vinyl resins, acrylic resins and mixtures thereof. The adhesive 24 in this case preferably comprises vinyl resin and acrylic resin in a range of ratios of from about 1:99 to 99:1. Alternate adhesives may be used having varying levels of adhesion without departing from the present invention. Other examples of suitable adhesives include those comprising polystyrene and chlorinated olefins.

The base coat 26, which functions primarily to provide a base color to the film 10, is adhered to the top of the heat-activatable adhesive layer 24. The base coat 26 comprises organic and inorganic pigments, solvent and a resin such as an acrylic resin, a vinyl resin and mixtures thereof. During the curing, i.e., film drying, the organic solvent is substantially removed by evaporation due to the application of heat. The acrylic and vinyl resins may be any suitable acrylic or vinyl resin, either synthesized or commercially available, capable of bonding to the adhesive layer 24 and optionally capable of cross-linking to provide a protective base for the film 10. Preferably, the solvent comprises from about 50% to about 70% by weight of the base coat formulation prior to drying. The resin or resin mixture preferably comprises from about 50% to about 90% by weight of the base coat, on a solids basis. The pigments comprise from about 10% to about 50% by weight on a solids basis. The base coat 26 may be omitted from the film 10 without departing from the present invention if a thinner, less durable film 10 is desired for a particular application. If the base coat 26 is omitted, a base color may be provided to the film 10 by addition of pigment to the adhesive layer 24.

The particular pigments and resins used in the base coat 26 are dependent upon the substrate 18 to which the film is to be affixed and the base color selected for the particular wood grain pattern to be provided by the film 10. It is understood by those skilled in the art that selection of such a base coat 26 pigment varies with the desired wood-grain appearance as the base coat imparts the base color for a realistic wood pattern. Suitable pigments which may be used in the base coat 26 of the present film 10 include titanium dioxide, silica, iron oxides, talc, mica, clay, zinc oxide, carbon black, lead chromate, metallic pigments, molybdate orange, calcium carbonate and barium sulfate.

In the preferred embodiment shown in FIGS. 1 and 2 at least one print coat 28a, 28b is adhered to the top of the base coat 26. The print coats are depicted in FIGS. 1 and 2 for the purpose of clarity and ease of illustration as solid layers. It will be understood by those skilled in the art that such layers 28a, 28b may be only partial in nature as a result of the method of application in a layered pattern. The print coats 28a, 28b comprise various inks applied by a series of gravure rollers. The gravure rollers impart a wood-grain pattern 25 as shown in FIG. 3, to the film 10 by applying varying shades of ink in a layered and registered manner, resulting in a real wood appearance. Preferably from about 1 to about 5 print layers 28a, 28b are provided (only two are shown in the drawings).

It will be understood by one skilled in the art that a solid colored, textured film may be made without the use of print layers 28a, 28b, without departing from the present invention. The print layers 28a, 28b primarily function to provide the appearance desired by the individual practicing the invention. Therefore, an altered pattern or film appearance having enhanced tick marks is contemplated in practicing the present invention. It will also be understood that patterns other than wood-grain which are enhanced in appearance by addition of an enhanced tick 14 are within the scope of this invention.

A protective layer 30 which may also serve as a release layer is adhered to the top of the print layers 28a, 28b. The protective layer 30 comprises a lacquer-based coat which may be derived from either thermosetting or thermoplastic resins. In the preferred embodiment, a thermoplastic protective layer 30 is provided to the film 10. The thermoplastic protective layer 30 is comprised of one or more non-reactive resins. The non-reactive resins comprise those thermoplastic resins lacking in reactive functionality, i.e., a resin substantially free from hydroxyl and carboxyl groups such as those used in the tick 14 formulation as described in detail below. Preferably, the protective layer 30 is a clear thermoplastic lacquer such as a non-reactive acrylic resin, a non-reactive vinyl resin or mixtures of these resins. It will be understood by those skilled in the art that other non-reactive thermoplastics may be substituted for or combined with the non-reactive vinyl and acrylic resins without departing from the present invention.

The reactive resins and catalyst within the ticks 14, as described below, react with the non-reactive resins of the protective layer 30 providing intercoat adhesion. The actual mechanism or nature of this reaction is unknown; however, it is believed that the reaction provides polar and/or chemical cross-linking between the ticks 14 and the protective layer 30 such that the ticks 14 and the protective layer 30 are adhered. The ticks 14 are also adhered to the carrier sheet 16. The level of adhesion derived from the strength of the bonds between the reactive resins in the ticks 14 and those resins within the protective layer 30 as well as the level of adhesion derived from the strength of the bonds between the carrier sheet 16 and those resins within the ticks 14 should each be greater than the level of intermolecular cohesion within the ticks 14 to facilitate uniform separation of the ticks 14 upon removal of the carrier sheet 16. It will be understood from the above that the resins of the ticks 14 should be selected so that they do not bond with each other or so that they form bonds of a lesser strength than the bonds formed between the resins within the ticks 14 and the carrier sheet and between the resins within the ticks 14 and the resins within the protective layer 30.

The protective release layer 30 within the transfer layer 12 is preferably from about 30% by weight to about 50% by weight solvent, and more preferably from about 30% to about 40% by weight solvent, prior to heat curing. The release layer 30 further comprises from about 25% to about 85% by weight non-reactive thermoplastic resin, more preferably from about 30% to about 60% by weight polymethylmethacrylate or a similar resin. Preferably from about 2% to about 10% by weight on a solids basis, more preferably from about 3% to about 7% by weight, of a slip agent such as wax, silicone, fluoropolymer or other similar compound known to those skilled in the art should be added to the protective release layer 30 in order to provide resistance to surface damage such as scratches or scuff marks. From about 0.2% to about 5% by weight, and preferably from about 0.2% to about 3.0% by weight of a polar, reactive resin may optionally be included. This resin is preferably a reactive resin such as a reactive vinyl resin, a reactive acrylic resin or mixtures of reactive vinyl and acrylic resins, and may be provided to the protective release layer 30 and in different amounts to provide varying levels of adhesion between the ticks 14 and the protective release layer 30. In addition, the release layer 30 may comprise from about 0.5% to about 5% by weight, and preferably from about 0.5% to about 1.5% by weight vinyl ethylacetate which functions to provide flexibility as well as to promote a low level of adhesion between the protective release layer 30 and the ticks 14.

Some adhesion and bonding between the protective release layer 30 and the ticks 14 is necessary in order to successfully split the ticks 14. Therefore, small amounts of reactive resin are added to the release layer 30 to enhance tick 14 splitting. The level of adhesion derived from the strength of the bonds between the small amount of reactive resins within the release layer 30 and those resins within the ticks 14 and the level of adhesion derived from the strength of the bonds between the carrier sheet 16 and those resins within the ticks 14 must be greater than the level of intermolecular cohesion within the ticks 14 to successfully split the ticks 14.

The organic solvent used to formulate the release layer 30 will be dependent upon the resins selected. It will be understood to one skilled in the art that the protective release layer 30 formulation itself depends upon the resins selected for the ticks 14 as well as the type of carrier sheet 16 in order to properly facilitate the splitting of the ticks 14 between the protective release layer 30 and the carrier sheet 16.

The transfer layer 12 has a first film gloss level. Gloss is a measurement of the degree of specular reflectance. Typical gloss levels range from about 17% for a "super-matte" or flat appearance to about 90% for a glossy, shiny appearance as measured by a Gardner 60° gloss meter. It is understood by one skilled in the art that the gloss level of the transfer layer 12 is dependent upon the end use for or the desired appearance of the film 10. In addition, gloss levels lower than 17% may be provided to the transfer layer 12 as long as the gloss level of the transfer layer 12 is sufficiently different from that which will be imparted to the ticks 14 as described below. The difference should be large enough so that the optical effect provided by the color within the ticks 14 and the difference in gloss levels is perceived by the human eye as an indentation or elevation in the surface of the film 10. It is preferred that the difference between the gloss level of the tick 14 and the gloss level of the transfer film 12 is at least about 3% for the ticks 14 to be sufficiently perceptible.

The ticks 14 which are adhered to the protective layer 30 should preferably have a gloss level, or level of specular reflectance, of from about 1.5% to about 8% as measured using a Gardner 60° gloss meter. The scattering and absorption of light resulting primarily from the dispersed particles within the ticks 14, described below, affects the level of gloss within the ticks 14 as does the quantity and color of the dispersed pigment particles. A greater quantity of dispersed pigment particles contributes to a lower level of gloss within the ticks 14. Darker dispersed pigment particles will also contribute to lowering the level of gloss.

In addition, the degree of gloss within the carrier sheet 16 itself may contribute to the level of gloss within the top surface of the protective release layer 30 in the preferred embodiment. A higher gloss carrier sheet 16 provides a higher gloss to the transfer layer 12. A matte carrier sheet 16 is preferred with the low gloss level ticks 14 of the present invention. The carrier 16 preferably has a gloss level of from about 35% to about 40%. However, good quality films may be made with higher or lower level gloss carrier sheets 16. It is understood by those skilled in the art that the range of tick 14 gloss levels may extend higher than 8% depending upon the surface gloss of the transfer layer 12 without departing from the present invention.

The ticks 14 are formulated from an organic solvent dispersion having dispersed particles of pigment, wax and fluoropolymer comprising from about 35% to about 65% by weight, preferably from about 55% to 65% by weight organic solvent, prior to drying the dispersion. The organic solvent used is dependent upon those resins to be combined in the tick 14 formulation. It will be understood by those skilled in the art which solvents are suitable with the various resins selected for use in formulating the ticks 14.

The remainder of the tick 14 formulation comprises dispersed particles, a mixture of soluble resins and a catalyst. The soluble resins provide a matrix for the dispersed particles, and also function as a wetting medium for the pigment particles. These resins when used in various layers of the film 10 in addition to the ticks 14 also improve flowability and impart overall hardness and abrasion resistance to the system. The soluble resin mixture is comprised of a mixture of one or more reactive resins and one or more non-reactive resins.

The reactive resin component serves to bond the ticks 14 to the carrier sheet 16 and to the protective release layer 30. The reactive resin may also have a cross-linking mechanism, effectively preventing unwanted resin absorption or migration from the other layers of the film 10. Unwanted absorption of resin from other layers may result in an unwanted increase in the gloss level of the ticks 14. In addition, such absorption may lead to an inconsistent gloss level for the ticks 14 and/or a non-uniform release of the carrier sheet 16 from the film 10. The reactive resins may be any polyester, vinyl or acrylic or other similar thermosetting resin with hydroxyl or carboxyl functionality. Alternative reactive resins include epoxy resins cured with amine compounds.

Preferably the reactive resins include acrylic copolymers and terpolymers and vinyl copolymers and terpolymers. The preferable reactive acrylics are copolymers and terpolymers of polymethylmethacrylate. Preferred reactive vinyls include polyvinyl chloride solution grade resins, preferably copolymers or terpolymers of polyvinyl chloride. An example of a preferred terpolymer is the reaction product of a random polymerization of vinyl acetate, vinyl chloride and acrylate.

Preferably the reactive resin component present within the mixture of soluble resins comprises resins such as melamine, urea formaldehyde or mixtures of melamine and urea formaldehyde resins. It is understood to those skilled in the art that any melamine and/or urea formaldehyde resin which can react with the reactive acrylic and/or vinyl resins in the ticks 14 in the presence of the below-described catalyst may be used without departing from the present invention.

The reactive resins should comprise from about 10% to about 30% by weight on a solids basis, and more preferably, from about 15% to about 25% by weight on a solids basis of the ticks 14. The preferred ratio of reactive acrylic and/or vinyl polymer to melamine and/or urea resin within the ticks 14 is from about 0.5:1 to about 8:1, and more preferably is from about 1:1 to 1.6:1.

Suitable acid catalysts for use in the ticks 14 are those which promote or accelerate cross-linking reactions at lower temperatures between the reactive resins within the ticks 14 and the reactive resins present in the protective layer 30 as well as cross-linking reactions between the reactive resins within the ticks 14 and the carrier sheet 16. These cross-linking reactions create cross-linked polymer structures at the areas of interface between the ticks 14 and the protective layer 30 and the ticks 14 and the carrier sheet 16 such that the ticks are strongly bonded to the surrounding layers at these interface areas. The result is that upon removal of the carrier sheet 16, the ticks 14 will readily Split due to a lower level of intermolecular bond strength or cohesion between the molecules within the ticks 14 than is present within the bonds created at the interfacial areas.

Typical suitable catalysts for use in such crosslinking reactions include such materials as organic, sulfonic or mineral acids and mixtures thereof, such as sulfuric acid, p-toluene sulfonic acid or an amine-block acid such as pyridine. A blocked acid catalyst may also be used; however, the reaction rate may be reduced. The ticks 14 preferably comprise from about 0.2% to about 3% by weight of catalyst on a solids basis.

The non-reactive resins are any thermoplastic resins substantially free of carboxyl or hydroxyl functionality. The non-reactive resin component improves pigment wetting.

The dispersed particles in the ticks 14 are comprised of fluoropolymer, wax and pigment. The fluoropolymer may be a homopolymer, copolymer or terpolymer of polyvinylidene fluoride, polyvinylidene chloride, polyvinyl fluoride, polyvinyl chloride, and polychlorotrifluoroethylene; a copolymer of tetrafluoroethylene and hexafluoropropylene; or a copolymer of vinylidene fluoride and hexafluoropropylene. Preferably, the fluoropolymer is a polyvinylidene fluoride homopolymer. The particle size of the fluoropolymer should preferably be from about 0.2 to about 5 microns. Dispersed particles of fluoropolymer preferably comprise from about 0% to about 40% by weight, and more preferably from about 20% to about 40% by weight of the ticks 14 on a solids basis. The fluoropolymer helps to stabilize the tick 14 formulation such that the portion of the tick markings which remains on the transfer layer 12 presents a more uniform surface.

The pigment particles within the ticks 14 may be of any color and either organic or inorganic; however, it is preferred that the pigment particles in the tick layer 18 are dark in color. The dark pigments may be used in combination with a white pigment such as titanium dioxide. White pigments may be added to the dark pigments in varied amounts to provide a wider choice of color shading than is normally available from commercial dark pigments, thereby enhancing the different degrees of color contrast achievable between the ticks 14 and the transfer layer 12. Preferably the dark pigment is one such as carbon black or black iron oxide. Solvent soluble dyes may be substituted for or used in combination with the pigment. The pigment particles are ground in a mill until a preferred Hegman grind of 7 is attained, corresponding to about 5 microns. The corresponding pigment particle size should preferably be no greater than 20 microns. Dispersed pigment particles, preferably comprise from about 15% to about 30% by weight on a solids basis of the ticks 14.

The wax component in the ticks 14 aids in the release of the carrier sheet 16 and contributes to the low gloss level of the ticks 14. The wax is preferably a micronized wax and may be any micronized wax which has a melting point from about 82° C. to about 177° C. The wax should be dispersible to a particle size range of from about 1 to about 25 microns, preferably from about 1 to about 10 microns. Other synthetic waxes known to those skilled in the art may be substituted as long as the molecular weight of the wax is high enough to form a solid at ambient temperature so that the wax is dispersible without solubilizing. The dispersed wax particles preferably comprise from about 0% to about 20% by weight on a solids basis and preferably from about 10% to about 20% by weight on a solids basis of the ticks 14.

The carrier sheet 16 which is adhered to the ticks 14 may be, for example, polyester, polyolefin or cellophane. Preferably, the carrier sheet is a polyester. The polyester is preferably from about 75 to about 92 gauge polyester and is biaxially oriented.

Typical preferred organic solvents useful for the formulations of the various layers of the present film 10 include acetone, methylethylketone, methylisobutylketone, ethanol, diacetone alcohol, isopropyl alcohol, ethylacetate, ethylbutyl acetate, methylpyrrolidone, cyclohexanone, glycol ethers, toluene and xylene. It is understood by one skilled in the art that the appropriate solvent should be chosen with regard to its compatibility with those resins which are used in the formulations of the various layers of the film 10. Factors such as intended end use, type of carrier 16, resin solubility, potential toxicity, and boiling point should be considered in choosing an appropriate solvent.

The film 10 may further comprise various additives known to those skilled in the art including, among others, leveling agents, wetting agents, adhesion promoters, pigment stabilizers and dispersants. Such additives may be present throughout all layers of the film 10, and may comprise up to about 2% of the film 10 on a solids basis.

The film 10 is preferably prepared by direct gravure application of the layers of the film 10 to the carrier 16 by any typical gravure apparatus. The weight of the coatings is dependent primarily upon the particular resins selected for the various layers of the film 10 and the quantity of pigmentation added to the film 10. The total coating weight generally ranges from about 30 to about 40 grams/square meter; however, in certain applications, the weight may be as high as 80 grams/square meter or as low as 5 grams/square meter.

The invention will now be described in more detail with respect to the following specific, non-limiting examples:

EXAMPLE I

A tick formulation was prepared by mixing all of the components in the weight percentages listed in Table 1, below, with the exception of the wax, the polyvinyl fluoride and the catalyst in a jacketed vessel having cooling water circulating through the jacket for temperature control. Throughout the procedure for preparation of the tick formulation, the temperature of the components should be kept below about 38° C. at all times to prevent gelation.

TABLE I

| Component in Tick Formulation | Weight Percentage (%) |
|---|---|
| Cyclohexanone | 23.6 |
| Methylisobutylketone | 20.4 |
| Ethyl Alcohol | 5.2 |
| Polyvinyl Terpolymer (3% OH Groups) (Tg = 53° C.) | 10.0 |
| Hexamethoxymethyl Melamine (Specific Gravity = 1.2) | 8.0 |
| Polymethylmethacrylate (Tg = 86° C.) (Specific Gravity = 1.17) | 2.0 |
| Amide Wax (Drop Point = 141° C.) (Acid Number ≦ 10) | 7.0 |
| Polyvinylidene Flouride (Specific Gravity = 1.7) | 12.0 |

TABLE I-continued

| Component in Tick Formulation | Weight Percentage (%) |
| --- | --- |
| Black Iron Oxide (pigment) | 11.0 |
| Strong Acid Catalyst | 0.8 |

The mixture is then milled or ground. The polyvinylidene fluoride and wax are dispersed independently and separately from the components in the vessel, and added to the ground mixture in the jacketed mixing vessel and mixed at low-shear rates. Immediately before application of the tick formulation to the carrier sheet by gravure roller, the acid catalyst was added to the formulation. The tick layer was applied to a polyester film carrier sheet having a matte gloss level.

A protective layer formulation was prepared and contained the ingredients in the weight percentages listed in Table II.

TABLE II

| Protective Release Layer Components | Weight Percentage (%) |
| --- | --- |
| Methylethylketone | 26 |
| Polymethylmethacrylate (non-reactive acrylic) (Tg = 105° C.) (Specific Gravity = 1.17) | 37 |
| Polyethylene Wax (23% Oxygen) (Melting Point = 140° C.) | 11 |
| Toluol | 26 |

The protective release layer formulation was applied by gravure roller to the cured ticks already adhered to the carrier sheet, and cured at the same temperature and in the same manner as the tick formulation. A print layer providing a wood-grain pattern was applied to the protective layer by gravure roller and cured. The composition of the print layer is shown in Table III.

TABLE III

| Grain Ink Component | Weight Percentage (%) |
| --- | --- |
| Toluol | 37.8 |
| Methylisobutylketone | 37.8 |
| Butyl acetate | 8.4 |
| Polyvinyl Chloride Terpolymer (Tg = 72° C.) (Specific Gravity = 1.35) | 13.4 |
| Carbon Black | 2.6 |

A base coat having the components shown in Table IV and an adhesive coat having the components shown in Table V with the respective weight percentages were then consecutively applied to the print layer and cured in the same manner described above.

TABLE IV

| Base Coat Component | Weight Percentage |
| --- | --- |
| Toluol | 28.9 |
| Butyl Acetate | 9.6 |
| Ethyl Alcohol | 0.5 |
| Anionic Wetting Agent | 0.5 |
| Polyester Adipate | 5.3 |
| Yellow Iron Oxide | 20.7 |
| Red Iron Oxide | 7.0 |
| Black Iron oxide | 3.7 |

TABLE IV-continued

| Base Coat Component | Weight Percentage |
| --- | --- |
| Polymethylmethacrylate (30% in toluene and butanol) (Tg = 105° C.) | 22.6 |
| Polymethylmethacrylate (Tg = 86° C.) (Specific Gravity = 1.17) | 1.2 |

TABLE V

| Adhesive Component | Weight Percentage |
| --- | --- |
| Toluol | 50.0 |
| Methyl, n-butylmethacrylate Copolymer (Tg = 80° C.) (Acid Number = 5) | 50.0 |

The finished film was hot-stamped onto a styrene substrate according to typical methods known to those skilled in the art, and the carrier film was removed. The film, upon removal of the carrier, exhibited a tick pattern having tick exhibiting a gloss level of 3%. The ticks were readily distinguishable from the film at all viewing angles. The optical effect was perceived as an indentation and the additional color gave the ticks the appearance of a realistic wood ticks. The film was also readily overcoatable by a second piece of the same film.

I claim:

1. A heat transferable film for affixation to a substrate to be decorated, comprising:

(a) a transfer layer having a first gloss level and at least one color, the transfer layer affixable on the bottom to a substrate;

(b) a plurality of individual spaced-apart markings, the markings comprising a soluble resin mixture, particles dispersed within the soluble resin mixture, and a catalyst for promoting and accelerating cross-linking reactions between the soluble resin mixture and resins within the transfer layer and between the soluble resin mixture and a carrier sheet, the markings having a color different from the at least one color within the transfer layer and a second gloss level, different from the first gloss level, and the markings being adhered to the top of the transfer layer; and (c) the carrier sheet adhered to the top of the spaced-apart markings wherein upon application of heat and pressure to the film and subsequent removal of the carrier sheet, the individual spaced-apart markings are split along a plane generally parallel to that of the film, with a first portion of each marking remaining adhered to the carrier sheet and a second portion of each marking remaining adhered to the transfer layer such that the second portion of each marking forms a pattern of said markings on the top of the transfer layer.

2. The heat-transferable film according to claim 1, wherein the first gloss level is at least 3% greater than the second gloss level.

3. The heat-transferable film according to claim 1, wherein the second gloss level is from about 1.5% to about 8% as measured by a Gardner 60° gloss meter.

4. The heat-transferable film according to claim 1, wherein the transfer layer comprises:

(a) a heat-activatable adhesive layer for affixing the bottom of the transfer layer to a substrate;

(b) a base coat adhered to the top of the heat-activatable adhesive layer;

(c) at least one print layer comprising an ink pattern adhered to the top of the base coat; and (d) a protective release layer covering and adhered to the top of said at least one print layer, said protective release layer comprising a lacquer-based coat, wherein the individual spaced-apart markings are adhered to the top of the protective release layer.

5. The heat-transferable film according to claim 4, wherein the transfer layer comprises from 1 to about 5 grain print layers.

6. The heat-transferable film according to claim 4, wherein the protective layer is a thermoplastic lacquer comprising a non-reactive resin.

7. The heat-transferable film according to claim 6, wherein the protective release layer comprises, on a solids basis, from about 45% to about 85% by weight of a non-reactive thermoplastic resin, from about 2% to about 10% by weight of a slip agent, from about 0.5% to about 5.0% by weight vinyl ethylacetate.

8. The heat-transferable film according to claim 7, wherein the non-reactive resin is selected from the group consisting of homopolymers, copolymers and terpolymers of polymethylmethacrylate, polybutyl acrylate, polymethylacrylate, polyethylacrylate and mixtures thereof.

9. A heat transferable film for affixation to a substrate to be decorated, comprising:

(a) a transfer layer having a first gloss level and at least one color, the transfer layer affixable on the bottom to a substrate;

(b) a plurality of individual spaced-apart markings, the markings comprising a soluble resin mixture comprising a reactive resin and a non-reactive resin, particles of wax, pigment, and fluoropolymer dispersed within the soluble resin mixture, and a catalyst for promoting and accelerating cross-linking reactions between the soluble resin mixture and resins within the transfer layer and between the soluble resin mixture and a carrier sheet, the markings having a color different from the at least one color within the transfer layer and a second gloss level, different from the first gloss level, and the markings being adhered to the top of the transfer layer; and (c) the carrier sheet adhered to the top of the spaced-apart markings wherein upon application of heat and pressure to the film and subsequent removal of the carrier sheet, the individual spaced-apart markings are split along a plane generally parallel to that of the film, with a first portion of each marking remaining adhered to the carrier sheet and a second portion of each marking remaining adhered to the transfer layer such that the second portion of each marking forms a pattern of said markings on the top of the transfer layer.

10. The heat-transferable film according to claim 9, wherein the particle size of the dispersed particles of fluoropolymer is from about 0.2 to about 5 microns.

11. The heat-transferable film according to claim 9, wherein the fluoropolymer is selected from the group consisting of homopolymers, copolymers and terpolymers of polyvinylidene fluoride, polyvinyl fluoride, polyvinylidene chloride, polyvinyl chloride, polychlorotrifluoroethylene; copolymers of tetrafluoroethylene and hexafluoropropylene; and copolymers of vinylidene fluoride and hexafluoropropylene.

12. The heat-transferable film according to claim 9, wherein the fluoropolymer comprises a polyvinylidene fluoride homopolymer.

13. The heat-transferable film according to claim 9, wherein the individual spaced-apart markings comprise, on a solids basis, from about 11% to about 30% by weight soluble resin mixture, from about 0% to about 20% by weight wax particles, from about 15% to about 30% by weight pigment particles, from about 0% to about 40% by weight fluoropolymer particles, said particles of wax, pigment and fluoropolymer dispersed within said soluble resin mixture, and from about 0.5% to about 1% by weight catalyst for promoting and accelerating cross-linking reactions between the soluble resin mixture and resins within the transfer layer and between the soluble resin mixture and the carrier sheet.

14. The heat-transferable film according to claim 9, wherein the pigment is selected from the group consisting of carbon black and iron oxide.

15. The heat-transferable film according to claim 9, wherein the particle size of the dispersed particles of pigment is no greater than about 20 microns.

16. The heat-transferable film according to claim 9, wherein the wax is a micronized wax having a particle size of from about 1 to about 25 microns.

17. The heat-transferable film according to claim 9, wherein the wax has a melting point of from about 82° C. to about 177° C.

18. The heat-transferable film according to claim 9, wherein the reactive resins are selected from the group consisting of acrylic copolymers and terpolymers, vinyl copolymers and terpolymers, melamine, urea formaldehyde and mixtures thereof.

19. The heat-transferable film according to claim 9, wherein the non-reactive resins are selected from the group consisting of homopolymers, copolymers and terpolymers of polymethylmethacrylate, polybutyl acrylate, polymethylacrylate, polyethylacrylate and mixtures thereof.

20. The heat-transferable film according to claim 1, wherein the carrier sheet comprises a polymer selected from the group consisting of polyester, polyolefin and cellophane.

* * * * *